United States Patent [19]

Stern

[11] Patent Number: 4,689,480

[45] Date of Patent: Aug. 25, 1987

[54] ARRANGEMENT FOR IMPROVED SCANNED 3-D MEASUREMENT

[75] Inventor: Howard Stern, Greenlawn, N.Y.

[73] Assignee: Robotic Vision Systems, Inc., Hauppauge, N.Y.

[21] Appl. No.: 727,366

[22] Filed: Apr. 25, 1985

[51] Int. Cl.⁴ .............................................. G01C 3/08
[52] U.S. Cl. ...................................... 250/201; 356/4; 354/404
[58] Field of Search ................ 250/201 AF, 204, 560, 250/558; 356/1, 4, 2; 354/403–405; 358/88, 90

[56] References Cited

U.S. PATENT DOCUMENTS

| | | | |
|---|---|---|---|
| 4,248,532 | 2/1981 | Nosler | 356/1 |
| 4,269,512 | 5/1981 | Nosler | 356/1 |
| 4,304,487 | 12/1981 | Odone et al. | 356/1 |
| 4,373,805 | 2/1983 | Mallinson | 356/1 |
| 4,494,868 | 1/1985 | Lambeth | 356/1 |
| 4,522,492 | 6/1985 | Masunaga | 250/201 AF |

Primary Examiner—Edward P. Westin
Assistant Examiner—Charles F. Wieland
Attorney, Agent, or Firm—Max Fogiel

[57] ABSTRACT

An arrangement for 3-D optical measurement systems employing scanned light beams or planes. A lens used to image projected light that is reflected from a measured surface, is moved onto a light-sensitive detector. The lens movement is coordinated with the movement of the projected light beam or plane to assure that the image on the detector remains in sharp focus at all times. The sharp focus is maintained by moving the detector in coordination with the movement of the projected light beam or plane, or by changing the effective optical path lengths to the detector in coordination with the movement of the projected light beam or plane.

8 Claims, 8 Drawing Figures $d_o$ = distance of center of object to principal plane $d_i$ = distance of center of image to principal plane $f$ = focal length of lens $$\frac{1}{f} = \frac{1}{d_o} + \frac{1}{d_i}$$

1

ARRANGEMENT FOR IMPROVED SCANNED 3-D MEASUREMENT

BACKGROUND OF THE INVENTION

Three dimensional measurement systems based on computing the triangular intersection of projected light viewed from an angle by a light sensitive detector requires sharply imaged light and sufficient reflected light to exceed the detector noise level and ambient light level. On the projector side of the system, the sharply imaged light has to remain well focused over the depth for which the measurements are to be made. A projected narrow light beam or light plane provides measurements only along the narrow light path, thereby limiting the data obtainable. By scanning the light beam or plane, data can be obtained over a surface without moving the system. In scanning the light beam or plane, however, sharp imaging on the detector side of the system is adversely affected. This stems from the fact that a lens is used to image the reflected light onto the detector and the depth of focus is not very large when using a large lens aperture. The large aperture is needed to gather sufficient light for reliable detection. However, moving the light beam or plane defocuses the received light leading to imprecise measurement and lower light intensity, and this reduces measurement reliability. Increasing the projected light intensity is often not possible for reasons of safety or device limitations. A tradeoff therefore has had to be made between the various system parameters to obtain the optimal results within the given constraints.

SUMMARY OF THE INVENTION

It is the object of the present invention to overcome the prior-art disadvantages. A more particular object is to provide an improved arrangement for 3-D optical measurement systems employing scanned light beams or planes. In keeping with this object, and with still others which will become apparent, one aspect of the invention resides in an arrangement for moving the lens used to image the projected light reflected from the measured surface onto the light sensitive detector. The lens movement is carefully coordinated with the movement of the projected light beam or plane to assure that the image on the detector remains in sharp focus at all times.

In a second aspect of the present invention, sharp focus of the image on the detector is maintained by moving the detector in coordination with the movement of the projected light beam or plane.

In a third aspect of the present invention, sharp focus of the image on the detector is maintained by changing the effective optical path lengths to the detector in coordination with the movement of the projected light beam or plane.

The present invention will hereafter be described with reference to an exemplary embodiment, as illustrated in the drawing. However, it is to be understood that this embodiment is illustrated and described for the purpose of information only, and that nothing therein is to be considered limiting of any aspect of the invention.

DESCRIPTION OF A PREFERRED EMBODIMENT

Figure 1:
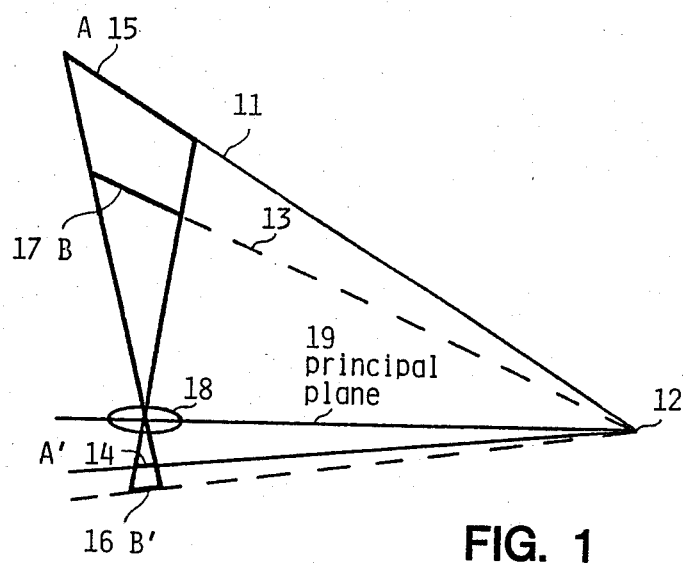
FIG. 1 is a diagrammatic view of a 3-D measurement system employing a projected light beam or plane and a light-sensitive detector.

The principles involved in making 3-D measurements with a projected light beam or plane and light sensitive detector are well described in U.S. Pat. No. 4,238,147. FIG. 1 diagrammatically illustrates the primary elements involved. A light source is used to develop a narrow beam of light or plane of light that is projected along path 11. A light-sensitive detector such as a linear array of photodetector cells or an area array of photodetector cells (e.g. a TV camera sensor chip) is placed at location 14 to detect image A' of region A at location 15 on path 11. Lens 18 images region A at A'. To minimize the aberrations introduced into the image by the lens 18, it is well known that regions A and A' should lie close to the lens 16 axis.

If the projected light is in the form of a narrow beam then region A is a line which images to a line at A' and an array or a linear array detector can detect the complete image. If the projected light is in the form of a plane then region A is an area which images to an area at A' and an area array is needed to detect the complete image. In the following it shall be assumed that the appropriate pair is used. The present invention applies to both.

Given that A' is the ideal location of the image of A, we know that all points along A focus most sharply at corresponding points along A'. This provides for the greatest measurement accuracy since a minimum of blurring means that the area of uncertainty of the measurement is minimized. This follows directly from the basic principle, in 3-D measurement by triangulation, that every point in the measurement field maps directly to a point in the image field. Blurring of the image therefore increases the area of the uncertainty of the measurement. Further, when the light is focused to the minimum size area, the light intensity is maximized at that location which provides the greatest signal to noise ratio in the detector output signal.

The present invention provides arrangements by which this ideal condition can be maintained in a 3-D scanned sensor. A scanned sensor increases the amount of data measurable by the sensor without moving the sensor. If a narrow light beam is projected along path 11, only measurements in region A can be made (a line sensor). If the beam is slowly rotated about point 12 to path 13 then all points in that area between region A and region B can be measured (an area sensor). Similarly any area sensor can sweep out a volume and provide measurements on any point within the volume (a volumetric sensor). Visualize path 11 as the edge view of a projected light plane or a narrow light beam that forms an effective light plane by scanning perpendicular to the plane of FIG. 1. All points in the region A (an area) can be measured, and as the plane is rotated about an axis perpendicular to the plane of FIG. 1 through point 12 to path 13, all points in the volume between area A and area B can be measured. The measurements are made sequentially as the plane sweeps through the volume. The problem encountered in such a system is that the image A' of region A moves from location 14 to location 16 as path 11 is swept toward path 13. The detector can be placed at an intermediate location between the extreme image locations 14 and 16 to minimize the defocusing. However, in practice it is found that the loss of light intensity through spreading as well as loss of image definition is so great that an improved apparatus is desired. The present invention provides this in the following ways.

Figure 2:
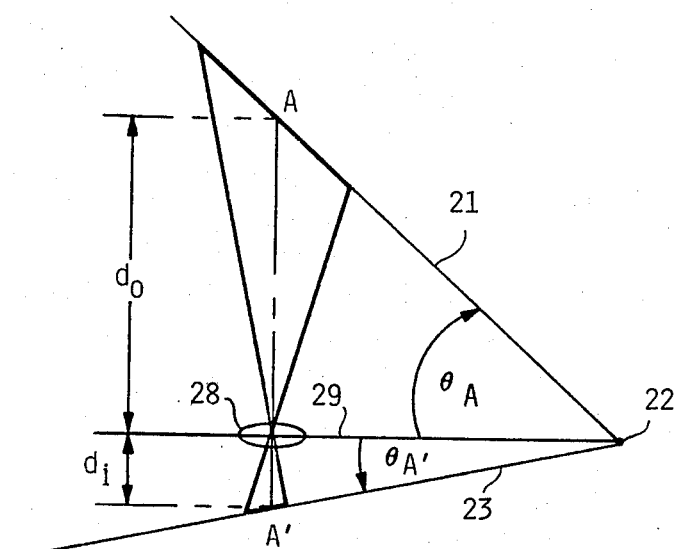
FIG. 2 shows the system of FIG. 1 with important parameters indicated thereon.

In FIG. 2 we show that path 21 of the projected light forms an angle $\theta_A$ to the principle plane 29 of the lens 28. It can be shown that image A' of region A on path 21 is at an angle $\theta_{A'}$ to the principle plane 29 and lies on a line through point 22, the intersection of path 21 and plane 29. In fact, if a light plane is perpendicular to the plane of FIG. 2 through path 21 and the principle plane is perpendicular to the plane of FIG. 2, then the image A' of area A lies in a plane perpendicular to the plane of FIG. 2 and intersects the line of intersection of the other two planes through point 22. The present invention is based on this basic principle which is employed in U.S. Pat. No. 4,238,147. If, while the projected path 21 is swept toward lens 28, the angular relationship $\tan \theta_{A'} = (\tan \theta_A)/m$ is maintained (m = |magnification| = do/di), then image A' of region A will be totally in focus. This can be accomplished in several ways.

Figure 3A:
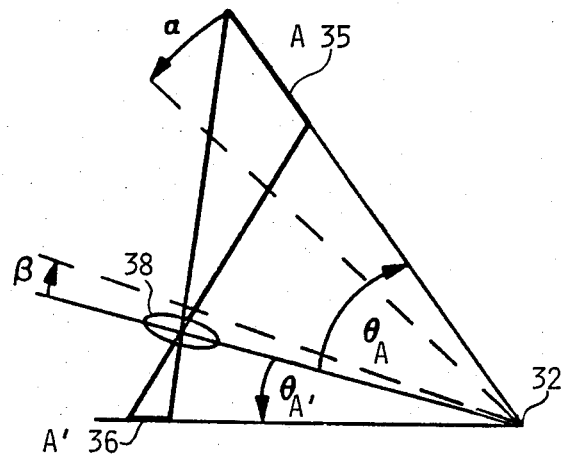
FIGS. 3a and 3b are diagrammatic views and show a method of compensating for defocusing by moving the lens.
Figure 3B:
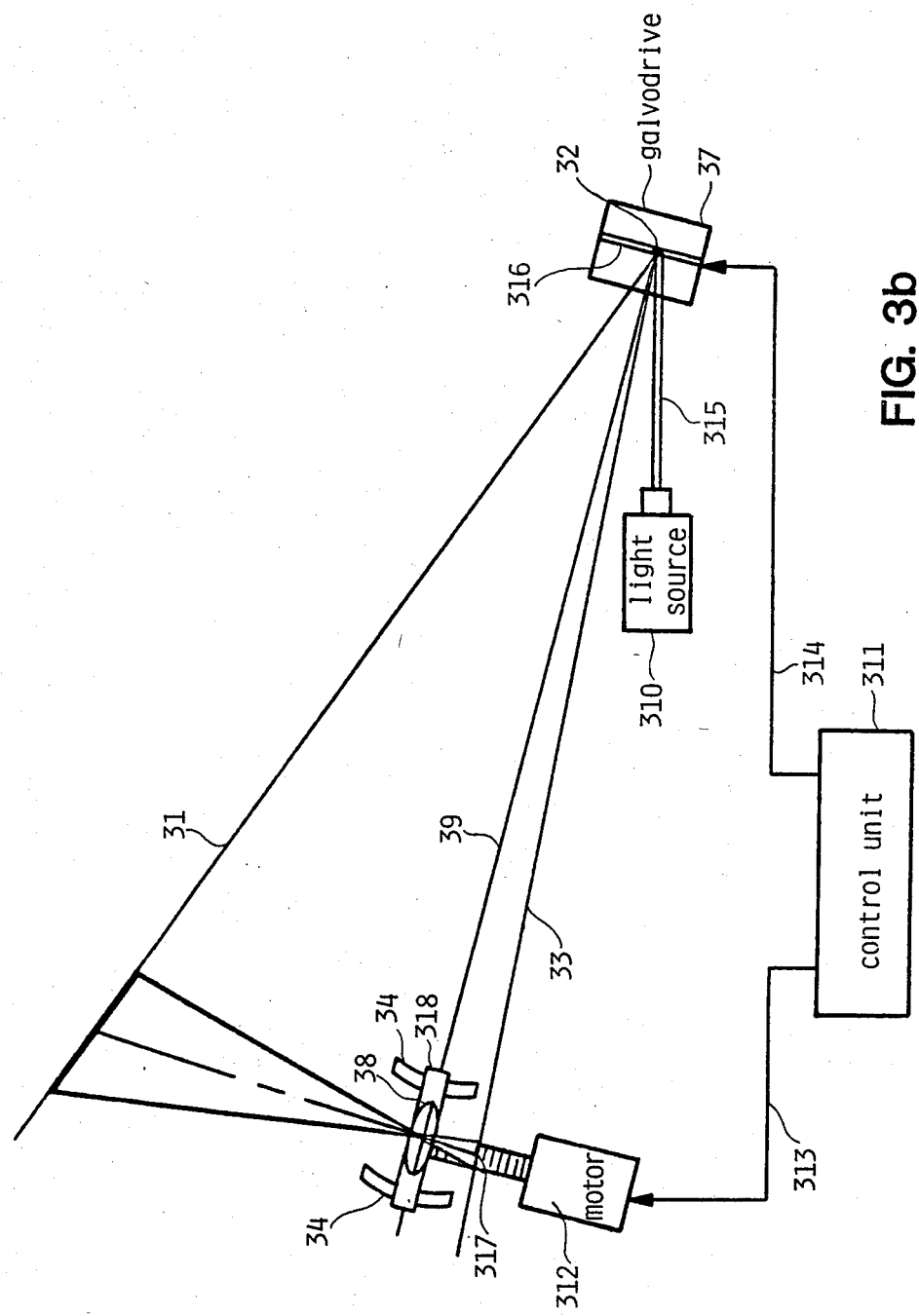

FIG. 3a and FIG. 3b illustrate an arrangement for moving lens 38 to maintain $\tan \theta_{A'} = (\tan \theta_A)/m$.

Light source 310 projects a narrow light beam or light plane (shown in edge view) 315 striking mirror 316 at pivot axis 32 of galvodrive 37 which rotates mirror 316 about pivot axis 32. Control box 311 controls the rotation angle of mirror 316 by control signal 314. Light beam or plane 315 is reflected along path 31 which rotates about axis 32 as mirror 316 is rotated. Detector 317 is placed in the image plane 33 which passes through pivot axis 32. Lens 38 is placed such that its principle plane 39 also passes through pivot axis 32 and focuses reflected light from surfaces intersecting light beam/plane on path 31 onto image plane 33. Lens 38 is mounted on a support 318 which is confined to travel on an arc whose center is pivot axis 32 by guide rails 34. Drive motor 312 precisely positions lens 38 along the arc exerting a force on support 318. Drive 312 is controlled by control box 311 via control signal 313. Control box 311 can be an analog or digital control that coordinates the motion (e.g. by a precomputed schedule) of lens 28 and light beam/plane 31 to maintain the $\tan \theta_{A'} = (\tan \theta_A)/m$ relationship. Instead of direct open loop drive as illustrated for simplicity, closed loop drive to position support 318 and/or galvodrive 37 more accurately can be used. Other means of redirecting the direction of light beam/plane 315 such as rotating mirror wheels, segmented lens discs, or segmented holographic discs, can be used. A narrow light beam 315 can be scanned in a small arc perpendicular to the plane of FIG. 3b, centered about the plane of FIG. 3b, prior to reaching mirror 32 to create an effective light plane 31 that then sweeps out a volume rather than an area. If m is sufficiently large, the arc through which lens 38 must be transported, may be approximated by linear translation to simplify the arrangement. In this case, the linear translation will be in a direction perpendicular to principal plane 39. Although electronic motion coordination is shown, mechanical methods may be employed (e.g. a cam).

Other means of synchronously adjusting the parameters of object plane, lens plane, and image plane via lens motion are anticipated. In particular, it is also desirable to maintain focus via adjustment of the focal length of lens 38 when such lens is made of multiple elements comprising a zoom lens. In this case the linear motion between the elements comprising lens 38 replaces the linear motion of the entire lens assembly such that the motion is perpendicular to the lens elements and the entire lens assembly is positioned to maintain the FIG. 3a relationships.

Figure 4A:
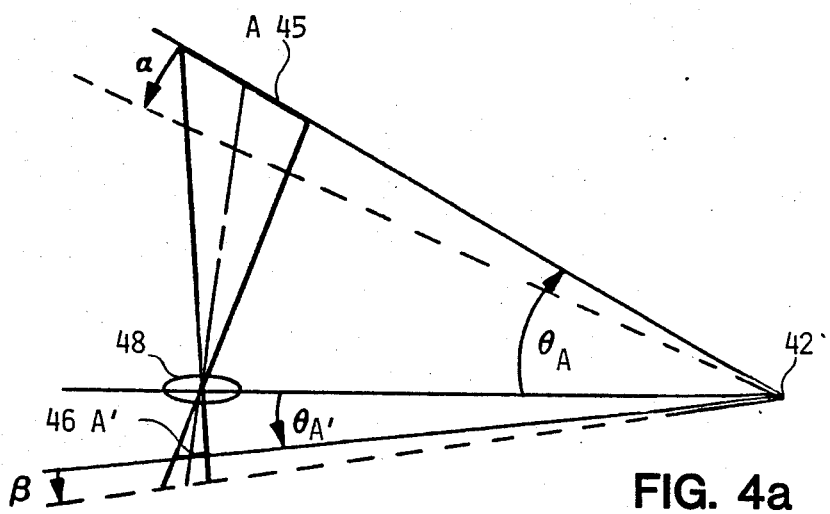
FIGS. 4a, 4b and 4c are diagrammatic views and show a method of compensating for defocusing by moving the detector.
Figure 4C:
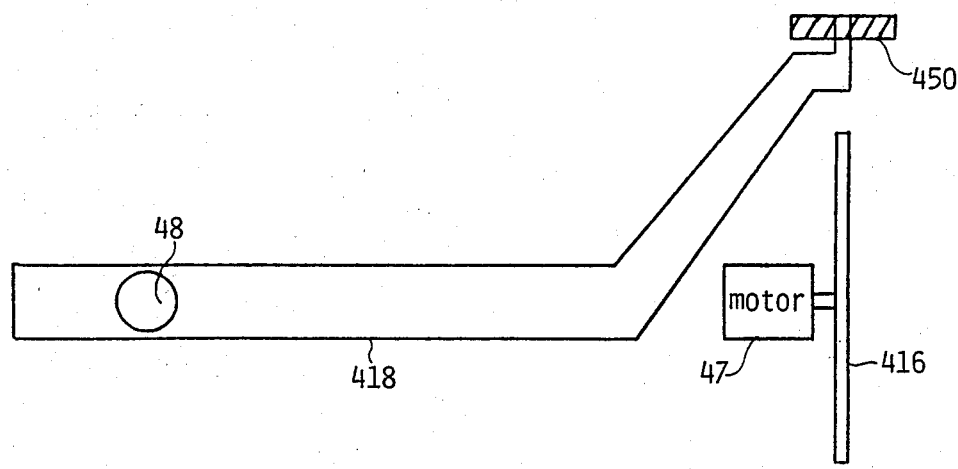
Figure 4B:
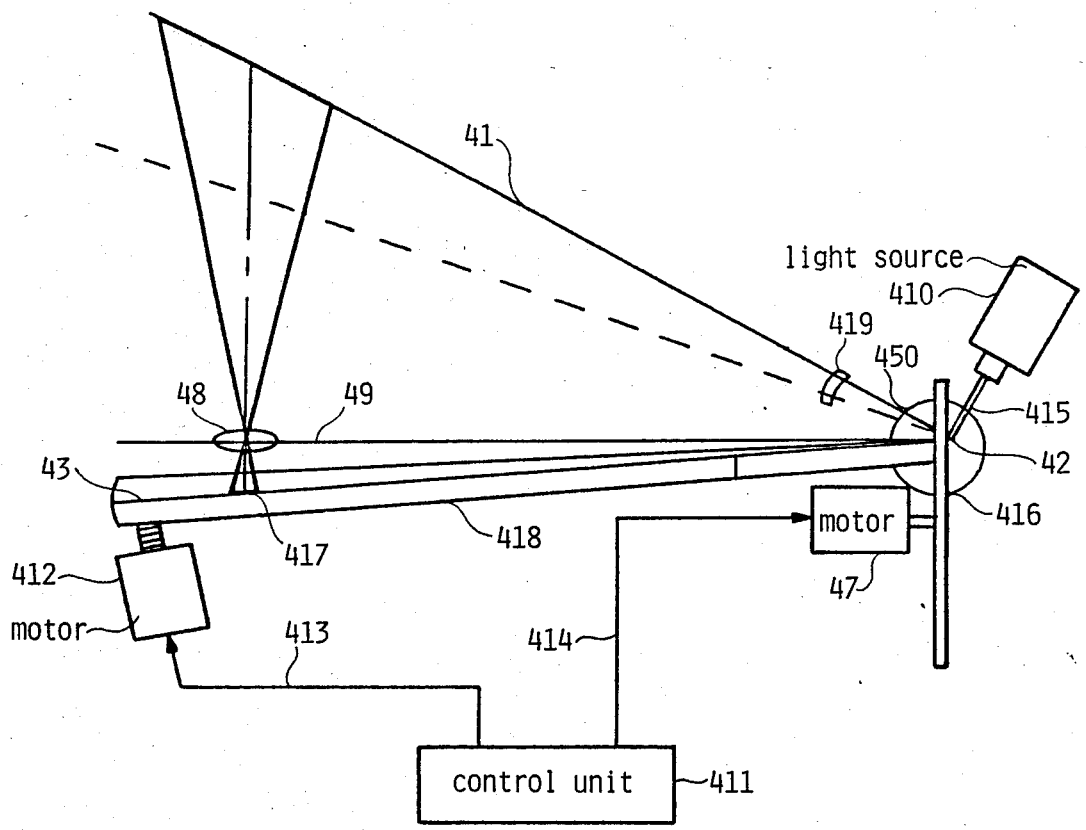

FIGS. 4a, 4b and 4c illustrate an arrangement for moving detector 417 to maintain $\tan \theta_{A'} = (\tan \theta_A)/m$.

Light source 410 projects a narrow beam of light 415 striking segmented holographic deflector disc 416 at point 42 which deflects beam 415 to path 41. A lens 419 can be inserted into path 41 to spread the beam into a plane perpendicular to the plane of FIG. 4b. Motor 47 rotates disc 416 under control of control box 411 via control signal 414. The light beam/plane traveling along path 41 is swept in an angle about point 42, as different segments rotate into the path of light beam 415. Lens 48 is placed such that its principal plane 49 passes through point 42 perpendicular to the plane of FIG. 4b. Detector 417 is placed in the image plane 43 which passes through point 43 also perpendicular to the plane of FIG. 4b. Lens 48 focuses reflected light from surfaces intersecting light beam/plane on path 41 onto image plane 43. Detector 417 is mounted on a support 418 which pivots via bearing 450 about an axis perpendicular to the plane of FIG. 4b through point 42. An offset arm arrangement places the pivot point behind the deflector wheel as shown in partial top view FIG. 4c. Drive motor 412 precisely positions detector 417 along a small arc by exerting a force on support 418. Drive 412 is controlled by control box 411 via control signal 413. Control box 411 coordinates the motion of detector 417 and light beam/plane 41 to maintain the $\tan \theta_{A'} = (\tan \theta_A)/m$ relationship. Other means can be used to deflect the light beam 415 and a light plane or effective light plane formed by a swept beam can be used. An area or volume sensor can use this arrangement to improve measurement performance. If m is sufficiently large, the arc through which detector 417 must be transported, may be approximated by linear translation to simplify the arrangement. In this case the linear motion is perpendicular to both the plane of FIG. 4b and detector 417. Again mechanical motion co-ordination may replace the illustrated electronic control.

Figure 5:
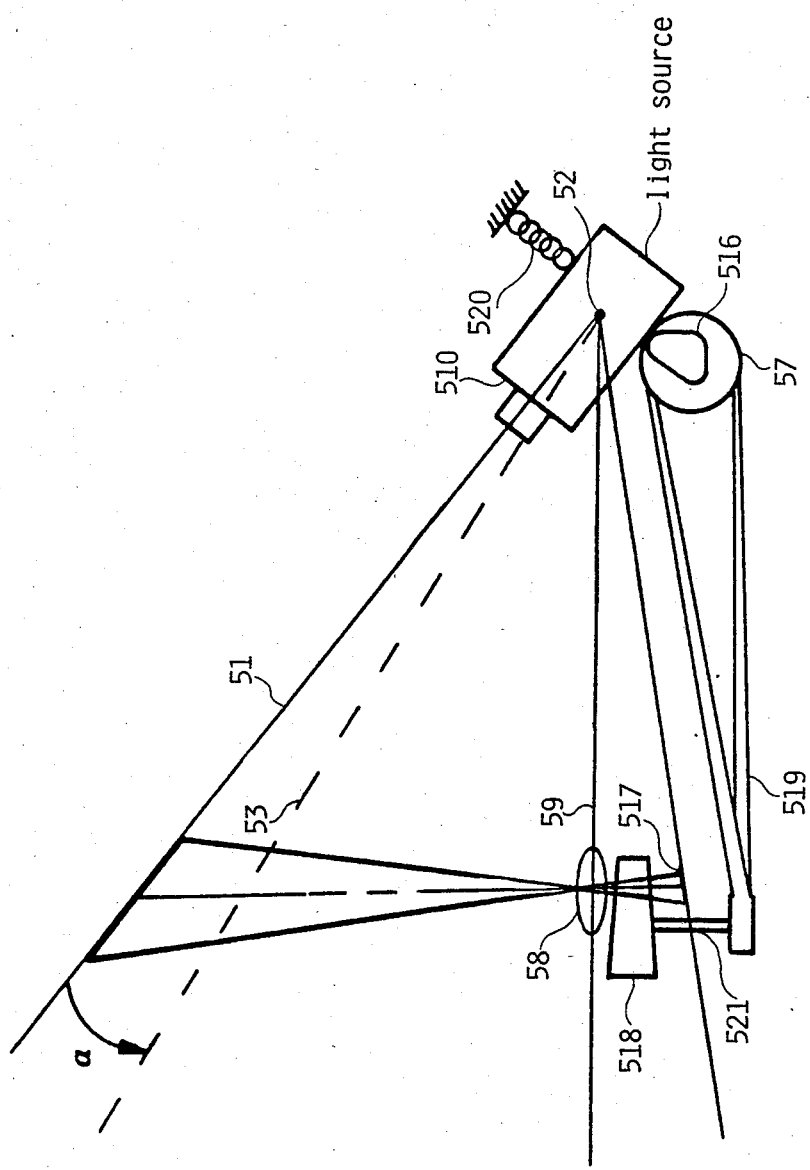
FIG. 5 is a diagrammatic view and shows a method of compensating for defocusing by altering the effective optical path lengths.

FIG. 5 illustrates an arrangement for altering the path length of light reflected off of a surface being measured so that the image plane remains coincident with the detector for all positions of the projected light beam/plane.

Light source 510 projects a narrow beam of light or plane of light perpendicular to the plane of FIG. 5 along path 51. Motor 57 rotates cam 516 which rotates light source 510 about pivot axis 52 against the opposing force of spring 520. The light path 51 is constructed to pivot about axis 52 which is perpendicular to the plane of FIG. 5. Lens 58 is placed such that its principal plane 59 passes through axis 52. Detector 517 is placed in the image plane of lens 58 which is moved from its normal location as a result of disc 518. Disc 518 may be optical glass or fiberoptic bundles parallel to the axis of rotation 521 of disc 518. The thickness of disc 518 is contoured to maintain a flat image plane. Lens 58 focuses reflected light, from surfaces intersecting light beam/plane on path 51, onto detector 517 after passing through disc 518. As motor 57 turns cam 516, belt 519 turns disc 518 about axis 521. The disc 518 thickness is contoured to maintain the image plane on detector 517 as the light beam/plane along path 51 sweeps toward path 53 and the disc 518 is rotated. An area or volume sensor can use this arrangement to improve measurement performance. The disc 518 can be replaced by a translating block of material with appropriate contour. Electonic coordination of the motion of disc 518 and projector 510 can be used in place of the mechanical coordination shown. If using a disk 518 made of fiber bundles, they have to be in contact with, or in close proximity to detector 517.

The arrangements shown do not require that the projector and camera be physically tied together. However, if separate, they must be calibrated for their configuration at the time of measurement.

Other means of moving the projected plane that do not use a fixed pivot point exist, such as in FIG. 3b, translating mirror 316 in direction of beam 315. This moves the projected object plane parallel to itself. Now the detector plane and lens principal plane no longer intersect the object plane at the same point. By moving either one to cause its principal plane to intersect the object plane where the other principal plane intersects the object plane, the image will once again be in focus on the detector. Also, since the projected beam angle does not change linear translation of either the lens or detector can be used to maintain the detector within the image plane.

The present invention has been described and illustrated with reference to an exemplary embodiment. However, it is not to be considered limited thereto, inasmuch as all modifications and variations which might offer themselves are intended to be encompassed within the scope of the appended claims.

What is claimed is:

1. An arrangement for compensating for defocusing effects of a moving projected object plane comprising: light-sensitive detector means having a detector plane; a projected object plane with light reflected therefrom; means for scanning said projected object plane; lens means with a lens plane for imaging projected light reflected from said object plane onto said detector plane; and means for controlling motion of said detector plane, projected object plane and lens plane so that all planes meet in a common line.

2. An arrangement as defined in claim 1, wherein said lens means is rotated about a common axis formed by an intersection of object plane and image plane.

3. An arrangement as defined in claim 1, wherein said lens means is translated along an optical axis of said lens means.

4. An arrangement as defined in claim 1, wherein said detector means is maintained in the image plane by rotating said detector means about a common axis formed by an intersection of said object plane and lens plane.

5. An arrangement as defined in claim 1, wherein said detector means is translated linearly in a direction required to remain in the image plane.

6. An arrangement as defined in claim 1, including a disc with contoured optical transmission lengths and located in a light path of said lens means, said disc being rotated in synchronism with said object plane during motion of said object plane to maintain a stationary image plane.

7. An arrangement as defined in claim 1, including optical transmission material with contoured optic transmission lengths and located in a light path of said lens means, said material being translated in synchronism with said object plane during motion of said object plane to maintain a stationary image plane.

8. An arrangement for compensating for defocusing effects of a moving projected object plane comprising: light-sensitive detector means having a detector plane; a projected object plane with light reflected therefrom; means for scanning said projected object plane; lens means with a lens plane for imaging projected light reflected from said object plane onto said detector plane; means for controlling motion of said projected object plane so that said detector plane, projected object plane and lens plane all meet in a common line; and an array of measured points on an object's surface being obtainable with stationary detector means having means to alter the optical path length of said reflected light.

* * * * *